United States Patent Office 3,308,025
Patented Mar. 7, 1967

3,308,025
METHOD FOR THE TREATMENT OF ESTROGEN DEFICIENCIES
Pierre Destouches, Paris, France, assignor to Roussel-Uclaf, S.A., Paris, France, a corporation of France
No Drawing. Filed Apr. 30, 1963, Ser. No. 277,043
3 Claims. (Cl. 167—74)

The present invention relates to the treatment of estrogenic deficiencies in females. More particularly, it relates to the administration of from 0.5 to 5 mg. per day of 17α-ethynyl-$\Delta^{1,4}$-androstadiene-11β,17β-diol-3-one to humans suffering from estrogenic deficiencies.

A number of estrogenically active compounds are known, in particular, naturally-occurring steroids, semi-synthetic steroids and non-steroid compounds. Most of these compounds are expensive and/or cause irritating side effects. Gastrointestinal irritation is frequently encountered on the administration of estrogens.

It is one object of the present invention to provide new and highly valuable estrogenically active compounds which are practically free of the disadvantages of the known estrogens and have proved to be highly effective in human therapy.

Another object of the invention is the development of a process for the treatment of estrogenic deficiencies in human therapy which comprises administering to humans a composition containing as an estrogen, 17α-ethynyl-$\Delta^{1,4}$-androstadiene-11β,17β-diol-3-one in a daily dose between about 0.5 mg. and about 5 mg.

A further object of the invention is the development of a process for the reduction of neurovegetative disturbances due to artificial or natural menopause in humans which comprises administering a daily dose of between about 0.5 mg. and about 5 mg. of 17α-ethynyl-$\Delta^{1,4}$-androstadiene-11β,17β-diol-3-one.

A still further object of the invention is the development of a composition for the oral treatment of neurovegetative disturbances due to menopause comprising about 0.5 part to 5 parts of 17α-ethynyl-$\Delta^{1,4}$-androstadiene-11β,17β-diol-3-one and from about 95 parts to about 99.5 parts of an inert excipient.

These and other objects of the invention will become more apparent as the description thereof proceeds.

It has now been found that 17α-ethynyl-$\Delta^{1,4}$-androstadiene-11β,17β-diol-3-one in small doses of from about 0.5 mg. to about 5 mg. per day has an excellent estrogenic effect in human females, especially on oral administration. This effect is completely unexpected since the compound is practically devoid of estrogenic activity when administered to the customary laboratory animals at daily dosages of up to 200 mg. per kilogram of body weight.

17α-ethynyl-$\Delta^{1,4}$-androstadiene-11β,17β-diol-3-one is described in copending, commonly-assigned United States Patent 3,127,314, filed January 18, 1960 and corresponds to the formula:

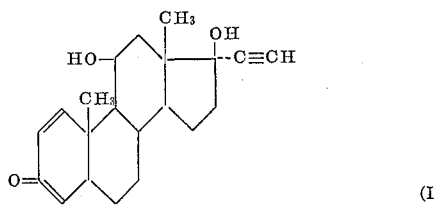

(I)

The compound is prepared by direct ethynylation of $\Delta^{1,4}$-androstadiene-3,11,17-trione without protection of the 3-keto group. The resulting 17-ethynyl-$\Delta^{1,4}$-androstadiene-17-ol-3,11-dione is converted into its 3-mono-semicarbazone, which is reduced by a mixed hydride of boron and an alkali metal or an alkaline earth metal, such as the borohydrides of lithium, sodium, potassium, or calcium. Thereby, the 3-semicarbazone of 17α-ethynyl-$\Delta^{1,4}$-androstadiene-11β,17β-diol-3-one is obtained which is converted, by treatment with pyruvic acid, into 17α-ethynyl-$\Delta^{1,4}$-androstadiene-11β,17β-diol-3-one, the active estrogenic agent according to the present invention.

The starting material, the $\Delta^{1,4}$-androstadiene-3,11,17-trione, is readily available by treating $\Delta^{1}$-dehydrocortisone with sodium bismuthate according to Hershberg et al. (J. Am. Chem. Soc., 1955, 77, 4781–4784).

Acetylene is attached to $\Delta^{1,4}$-androstadiene-3,11,17-trione according to known methods in the presence of alcoholates or amides of alkali metals or alkaline earth metals, such as potassium, lithium or calcium, in an inert solvent. It is also possible to carry out the process in the presence of liquid ammonia which, upon dissolving the alkali metals, produces their amides in situ. Upon completion of the reaction, the mixture is acidified and 11-keto-17α-ethynyl-$\Delta^{1,4}$-androstadienolone is extracted by means of a solvent and purified by recrystallization. In order to produce the corresponding 11β-hydroxylated compound, the 3-monosemicarbazone of the 3,11-diketone is prepared and is reduced in a solvent, preferably in aqueous tetrahydrofuran.

The following examples are submitted to illustrate the invention without, however, limiting thereby the scope of the appended claims. The melting points are instantaneous melting points determined on the Maquenne block.

EXAMPLE 1

Preparation of 17α-ethynyl-$\Delta^{1,4}$-androstadiene-17β-ol-3,11-dione

A solution of 2.35 g. of $\Delta^{1}$-dehydroadrenosterone in 30 cc. of dioxane is saturated with acetylene; to this solution there are added 12 cc. of a solution obtained from 9.5 g. of potassium metal, 120 cc. of tertiary amyl alcohol, and 30 cc. of benzene. This addition produces a bright, brick-red color and causes formation of a reddish-brown precipitate. Purified acetylene is passed through the mixture for 2½ hours, whereupon 10 cc. of 50% acetic acid are added. The solution turns pale yellow. Precipitation is accomplished by adding 300 cc. of water and extraction is carried out with chloroform. The chloroform layer is washed with water, dried over magnesium sulfate and filtered. The chloroform extract is treated with charcoal and is evaporated to dryness. The residue is treated with ether, filtered and washed with a very small amount of ice-cold alcohol and then with ether. After drying, 1.64 g. of an almost pure product of a very pale yellow color, having a melting point of 250–252° C. are obtained. In order to purify this product, it is dissolved in 40 cc. of absolute alcohol, the solution is concentrated to 5 cc., and the concentrated solution is permitted to crystallize. After drying, washing the residue with ice-cold alcohol, and again drying, there are obtained 1.23 g. of the pure product, having a melting point of 253° C., and an optical rotation $$[\alpha]_D^{20} = +80° \pm 2°$$

(concentration 1% in dioxane). The compound is solvated, it contains 0.7% of alcohol which it loses when heated to 135° C. It is soluble in 25 parts by volume of hot alcohol, in acetone, fairly well soluble in chloroform, almost insoluble in ether, and insoluble in water and in dilute aqueous acids and alkalis.

Analysis.—$C_{21}H_{24}O_3$; molecular weight: 324. Calculated: 77.75% C; 7.45% H. Found: 77.6% C; 7.4% H.

Upon heating to 200° C., this compound sublimates into colorless needles.

EXAMPLE 2

*Preparation of 17α-ethynyl-Δ$^{1,4}$-androstadiene 11β,17β-diol-3-one*

1 g. of said 17α-ethynyl-Δ$^{1,4}$-androstadiene-17β-ol-3,11-dione, having a melting point of 252° C., is heated at 60° C. with 60 cc. of a solution of 5% semicarbazide acetate in 90% alcohol for 14 hours. After cooling, the precipitate is filtered, the residue is washed with cold alcohol, and dried. About 1 g. of the 3-semicarbazone is obtained which is sufficiently pure for the subsequent reduction step.

0.90 g. of said semicarbazone is dissolved in a mixture of 20 cc. of tetrahydrofuran and 2 cc. of water. The solution is cooled to 5° C., and 2 g. of potassium boronhydride dissolved in 10 cc. of water are added. Two layers form rapidly. The mixture is heated to 45° C. for 4½ hours while stirring vigorously, is neutralized by adding 10 cc. of 50% acetic acid, and is concentrated in a vacuum at a temperature below 50° C. A product separates which is gummy when hot and becomes pulverulent upon cooling. After washing with water and drying, 0.9 g. of a pale beige powder is obtained, constituting the crude semicarbazone, which is directly hydrolyzed to 17α-ethynyl-Δ$^{1,4}$-androstadiene-11β,17β-diol - 3 - one by heating to 90° C. for 1½ hours with 6 cc. of 50% pyruvic acid. Complete dissolution takes place and the reaction mixture is poured into an aqueous solution of sodium bicarbonate in order to neutralize the pyruvic acid. After filtering, washing with water, drying, dissolving in 2 cc. of methanol, filtering hot, and concentrating to about one fifth of the original volume, 17α-ethynyl-Δ$^{1,4}$-androstadiene-11β,17β-diol-3-one is obtained, which crystallizes in big prisms of a very pale yellow color and has a melting point of 280° C. It sublimates from 250° C. on in colorless needles. It is soluble in methanol, insoluble in water, ether, and benzene. It can, moreover, be identified by its U.V. spectrum (λ max. 244 mµ; ε=13,080). The infra-red spectrum shows that the keto group in 11-position has disappeared while the 1,4-diene ketone function remains.

It has been found that the above-mentioned compound, given per os, has an excellent estrogen activity in human females when administered at dosage levels of from about 0.5 mg. to about 5 mg. per day.

In women who have neuro-vegetative disturbances due to artificial or natural menopause, 17α-ethynyl-Δ$^{1,4}$-androstadiene-11β,17β-diol-3-one is active from a dose of 0.5 mg. per day to reduce these neuro-vegetative disturbances when they are of minor nature. In the presence of more intense disturbances, the dosology can be increased up to 5 mg. per day with excellent results. In general, the compound possesses a reducing effect on these neuro-vegetative disturbances whose duration of effect in days is equivalent as an average to the number of milligrams of active compound administered.

When administered for its estrogen activity to either immature females or females in periods of genital activity, 17α-ethynyl-Δ$^{1,4}$-androstadiene-11β,17β-diol-3-one can be administered without inconvenience at a dose of 1 mg. per day.

The tolerance of 17α-ethynyl-Δ$^{1,4}$-androstadiene-11β,17β-diol-3-one is excellent at dosage levels of from 0.5 mg. to 5 mg. per day save in patients having certain types of hepatic disturbances.

The active compound is administered orally in the form of tablets, sugar coated pills, powders, solutions, emulsions, suspensions, or other known preparations.

When given in powder form in capsules, homogeneous dispersion of the active compound in the excipient is obtained either by intimately mixing and grinding the same with the solid diluting agent or by moistening and impregnating the pulverized excipient with a solution of active product and subsequent drying.

For tablets, sugar-coated pills and other solid forms of preparation, conventional solubilizing, binding, lubricating, disintegrating agents and other adjuvants may be used such as sugar, lactose, sorbitol, talc, starch, pectin, gelatin, gum arabic, methyl cellulose, carboxy methyl cellulose, yeast extracts, agar, calcium sulfate, calcium carbonate, kaolin, stearic acid, magnesium stearate, etc. The content of the active compound in such preparations may vary. Preferably the preparation should not contain less than 0.5% of the active agent. The optimum dose may vary between 0.5% and 5% by weight of the preparation.

The present invention comprises also the inclusion, in the above mentioned preparations, of other drugs the administering of which jointly with the estrogenic principle, may appear desirable.

EXAMPLE 3

*Preparation of tablets*

50 g. of 17α-ethynyl-Δ$^{1,4}$-androstadiene-11β,17β-diol-3-one are thoroughly mixed with 26.60 g. of sugar, 957.6 g. of lactose, and 332.5 g. of starch, 13.30 g. of gelatin moistened with water, and stirred so as to obtain a solid paste, which is granulated. The resulting granules are dried in a drying oven, ground and, after the addition of 20 g. of magnesium stearate, and 100 g. of talc are compressed to tablets, each weighing 150 mg. and containing 5 mg. of the active compound.

EXAMPLE 4

*Preparation of tablets*

500 g. of 17α-ethynyl-Δ$^{1,4}$-androstadiene-11β,17β-diol-3-one, 4000 g. of sugar, 16,100 g. of lactose, and 4000 g. of starch are thoroughly mixed, moistened with water, and stirred to yield a solid paste, which is granulated. The resulting granules obtained are dried in a drying oven, ground and, after the addition of 400 g. of magnesium stearate, are compressed to tablets each weighing 100 mg. and containing 2 mg. of the active compound.

Clinical tests of patients undergoing menopause, suffering from neurovegetative disturbances, demonstrated that a 5 mg. tablet of 17α-ethynyl-Δ$^{1,4}$-androstadiene-11β,17β-diol-3-one effected relief of the symptoms and caused a change in the appearance of vaginal smears. This relief was continued by a regime of one 5 mg. tablet every five to seven days. Daily dosage of a 5 mg. tablet over a period of 15 days was likewise well tolerated with good results.

In resume, a single dose in tablet form of 5 mg. of 17α - ethynyl-Δ$^{1,4}$-androstadiene-11β,17β-diol-3-one gives an estrogenic effect whose duration varies from 5 to 7 days.

More frequent or even a daily dose work satisfactory estrogenic effects and are generally well tolerated, save in certain hepatic subjects.

As a therapeutic regime, daily or every other day dosages of one tablet containing 1 mg. of 17α-ethynyl-Δ$^{1,4}$-androstadiene-11β,17β-diol-3-one likewise gave excellent results in alleviation of neurovegetative disturbances with no intoleration to patients who had undergone menopause. Vaginal smears indicated an estrogenic response to the therapeutic regime.

Clinical tests were also made on women in the period of genital activity by administration of a daily dose of a tablet containing 1 mg. of 17α-ethynyl-Δ$^{1,4}$-androstadiene-11β,71β-diol-3-one.

The test was made on 3 women aged from 20 to 35 years, to whom 1 mg. per day was administered.

No modification of the cycle nor of the menses occurring after the treatment was noted. One patient indicated a slight premenstrual tension at the time of the menses. The vaginal smears showed a quite sensible modification of the indices which were higher than in their entirety.

The preceding examples are illustrative of the invention. They are not however to be construed as limiting the same. It is obvious that other expedients known to those skilled in the art may be employed which come within the spirit of the invention and the scope of the appended claims.

What is claimed is:

1. A process for the treatment of estrogenic deficiencies in human therapy which comprises administering orally to humans a composition containing as an estrogen, 17α-ethynyl-$\Delta^{1,4}$-androstadiene-11β,17β-diol-3-one in a daily dose between about 0.5 mg. and about 5 mg.

2. A process for the reduction of neurovegetative disturbances due to artificial or natural menopause in humans which comprises administering orally a daily dose of between about 0.5 mg. and about 5 mg. of 17α-ethynyl-$\Delta^{1,4}$-androstadiene-11β,17β-diol-3-one.

3. A process for the reduction of neurovegetative disturbances due to menopause which comprises administering orally to human females a dose in one day of between about 0.5 mg. and about 5 mg. of 17α-ethynyl-$\Delta^{1,4}$-androstadiene-11β,17β-diol-3-one.

References Cited by the Examiner

UNITED STATES PATENTS

| | | | |
|---|---|---|---|
| 3,127,314 | 3/1964 | Goffinet et al. | 167—745 |
| 3,141,025 | 7/1964 | Nomine et al. | 167—745 |

ALBERT T. MEYERS, *Primary Examiner.*

JULIAN S. LEVITT, SAM ROSEN, *Examiners.*

LEROY B. RANDALL, *Assistant Examiner.*